United States Patent [19]

Bartkowiak

[11] Patent Number: 5,930,490
[45] Date of Patent: *Jul. 27, 1999

[54] MICROPROCESSOR CONFIGURED TO SWITCH INSTRUCTION SETS UPON DETECTION OF A PLURALITY OF CONSECUTIVE INSTRUCTIONS

[75] Inventor: John G. Bartkowiak, Austin, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/582,124

[22] Filed: Jan. 2, 1996

[51] Int. Cl.$^6$ .................................................. G06F 9/30
[52] U.S. Cl. ............................ 395/379; 395/388; 395/385
[58] Field of Search ............................. 395/379, 800.41, 395/385, 386, 388, 380

[56] References Cited

U.S. PATENT DOCUMENTS

| | | | |
|---|---|---|---|
| 4,484,272 | 11/1984 | Green ........................................ | 395/706 |
| 5,067,069 | 11/1991 | Fite et al. ................................. | 395/394 |
| 5,430,851 | 7/1995 | Hirata et al. ............................. | 395/388 |
| 5,459,843 | 10/1995 | Davis et al. ........................ | 395/800.23 |
| 5,481,684 | 1/1996 | Richter et al. .......................... | 395/388 |
| 5,481,751 | 1/1996 | Alpert et al. ............................. | 395/389 |
| 5,530,881 | 6/1996 | Inagami et al. .................... | 395/800.07 |
| 5,539,911 | 7/1996 | Nguyen et al. ..................... | 395/800.23 |
| 5,581,774 | 12/1996 | Yoshitake et al. ....................... | 395/386 |
| 5,586,277 | 12/1996 | Brown et al. ............................ | 395/386 |
| 5,598,544 | 1/1997 | Ohshima ................................. | 395/380 |
| 5,598,546 | 1/1997 | Blomgren ................................. | 395/385 |
| 5,613,080 | 3/1997 | Ray et al. ................................. | 395/390 |
| 5,638,525 | 6/1997 | Hammond et al. ....................... | 395/385 |
| 5,655,098 | 8/1997 | Witt et al. ................................ | 395/389 |
| 5,669,011 | 9/1997 | Alpert et al. ............................. | 395/389 |

FOREIGN PATENT DOCUMENTS

| | | |
|---|---|---|
| 0 071 028 A | 2/1983 | European Pat. Off. . |
| 0 295 646 A | 12/1988 | European Pat. Off. . |
| 0 478 904 A | 4/1992 | European Pat. Off. . |
| 2 199 896 A | 4/1974 | France . |
| 37 11 651 A | 10/1988 | Germany . |

OTHER PUBLICATIONS

Segars, S., et al., "Embedded Control Problems, Thumb, and the ARM7TDMI," IEEE Micro, vol. 15, No. 5, Oct. 15, 1995, pp. 22–30.

International Search Report for PCT/US 96/20044 dated Apr. 28, 1997.

*Primary Examiner*—Zarni Maung
*Attorney, Agent, or Firm*—Conley, Rose & Tayon, PC; B. Noel Kivlin

[57] ABSTRACT

A microprocessor configured to detect a plurality of consecutive instructions comprising a predefined instruction sequence is provided. The predefined sequence indicates that subsequent instructions belong to an alternate instruction set. In one embodiment, the number of subsequent instructions which belong to the alternate instruction set is encoded in the predefined instruction sequence. The subsequent instructions are routed to an execution unit or a separate processor for execution. Each instruction sequence within a program may be coded using the instruction set which most efficiently executes the function corresponding to the instruction sequence. In one embodiment, the microprocessor executes the x86 instruction set and the alternate instruction set is the ADSP 2171 instruction set. The predefined instruction sequence may comprise MOV instructions having the same destination, or identical XOR instructions. Portions of the program which may be executed more efficiently using x86 instructions may be coded in the x86 instruction set, while portions of the program which may be executed more efficiently using DSP instructions may be coded in the DSP instruction set. Each of the above portions is separated from other portions by the predefined instruction sequence, so that the microprocessor may determine which instruction set the instructions belong to.

16 Claims, 5 Drawing Sheets

MICROPROCESSOR CONFIGURED TO SWITCH INSTRUCTION SETS UPON DETECTION OF A PLURALITY OF CONSECUTIVE INSTRUCTIONS

BACKGROUND OF THE INVENTION

1. Field of the Invention

This invention relates to the field of microprocessors and, more particularly, to a microprocessor configured to interpret instructions according to one of a pair of instruction sets depending upon the detection of a predefined plurality of instructions. If the predefined plurality of instructions is not detected, instructions are interpreted as being from the first of the pair of instruction sets. If the predefined plurality of instructions is detected, instructions are interpreted as being from the second of the pair of instruction sets.

2. Description of the Relevant Art

Computer systems employ one or more microprocessors, and often employ digital signal processors (DSPs). The DSPs are typically included within multimedia devices such as sound cards, speech recognition cards, video capture cards, etc. The DSPs function as coprocessors, performing complex and repetitive mathematical computations demanded by multimedia devices and other signal processing applications more efficiently than general purpose microprocessors. Microprocessors are typically optimized for performing integer operations upon values stored within a main memory of a computer system. While DSPs perform many of the multimedia functions, the microprocessor manages the operation of the computer system.

Digital signal processors include execution units which comprise one or more arithmetic logic units (ALUs) coupled to hardware multipliers which implement complex mathematical algorithms in a pipelined manner. The instruction set primarily comprises DSP-type instructions (i.e. instructions optimized for the performance of complex mathematical operations) and also includes a small number of non-DSP instructions. The non-DSP instructions are in many ways similar to instructions executed by microprocessors, and are necessary for allowing the DSP to function independent of the microprocessor.

The DSP is typically optimized for mathematical algorithms such as correlation, convolution, finite impulse response (FIR) filters, infinite impulse response (IIR) filters, Fast Fourier Transforms (FFTs), matrix computations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily boolean/decision operations. Many of these mathematical algorithms perform a repetitive multiply and accumulate function in which a pair of operands are multiplied together and added to a third operand. The third operand is often used to store an accumulation of prior multiplications. Therefore, DSP hardware often includes hardware configured to quickly perform a multiply-add sequence. An exemplary DSP is the ADSP 2171 available from Analog Devices, Inc. of Norwood, Mass.

Many instruction sequences (or "routines") which perform complex mathematical operations may be more efficiently performed in a DSP instruction set such as that employed by the ADSP 2171 than in the x86 instruction set. Microprocessors often execute instructions from the x86 instruction set, due to its widespread acceptance in the computer industry. It is desirable to code the various instruction sequences of a program in the instruction set (DSP or x86, for example) which is most efficient at performing the task the instruction sequence represents. Furthermore, a method is desired for indicating the instruction set in which each instruction sequence in a particular program is coded. As used herein, an "instruction set" refers to a plurality of instructions defined for execution by a particular microprocessor. Each instruction within the instruction set is assigned a unique encoding identifying the instruction from the other instructions within the instruction set.

SUMMARY OF THE INVENTION

The problems outlined above are in large part solved by a microprocessor configured to detect a plurality of consecutive instructions comprising a predefined instruction sequence. The predefined sequence indicates that subsequent instructions belong to an alternate instruction set. In one embodiment, the number of subsequent instructions which belong to the alternate instruction set is encoded in the predefined instruction sequence. The subsequent instructions are routed to an execution unit or a separate processor for execution. Advantageously, a program may be coded using multiple instruction sets. Each instruction sequence within the program may be coded using the instruction set which most efficiently executes the function corresponding to the instruction sequence. The program may be executed more quickly than an equivalent program coded entirely in either instruction set.

In one embodiment, the microprocessor executes the x86 instruction set and the alternate instruction set is the ADSP 2171 instruction set. The predefined instruction sequence may comprise MOV instructions having the same destination, or identical XOR instructions. Advantageously, complex mathematical functions (which are more efficiently executed within a DSP) may be performed more efficiently than previously achievable using the x86 instruction set alone. Portions of the program which may be executed more efficiently using x86 instructions may be coded in the x86 instruction set, while portions of the program which may be executed more efficiently using DSP instructions may be coded in the DSP instruction set. Each of the above portions is separated from other portions by the predefined instruction sequence, so that the microprocessor may determine which instruction set the instructions belong to.

Broadly speaking, the present invention contemplates a microprocessor comprising an instruction cache, an instruction decode unit, a first execute unit, and a second execute unit. The instruction cache is configured to store a plurality of instructions including a plurality of consecutive instructions from a first instruction set and a second plurality of instructions. The plurality of consecutive instructions are defined to indicate that the second plurality of instructions are from a second instruction set different from the first instruction set. Coupled to receive the plurality of instructions from the instruction cache, the instruction decode unit is configured to identify the plurality of consecutive instructions. The first execute unit is coupled to receive a first instruction belonging to the first instruction set from the instruction decode unit, and is configured to execute the first instruction. Similarly, the second execute unit is coupled to receive a second instruction belonging to the second instruction set from the instruction decode unit, and is configured to execute the second instruction.

The present invention further contemplates a pattern recognition circuit comprising a first bus, a register, and a sequence detector. The first bus is configured to convey at least one instruction to the pattern recognition circuit. The register, coupled to the first bus, is configured to store the instruction. Coupled to the first bus and to the register, the sequence detector is configured to detect a predefined sequence of consecutive instructions by decoding at least the instruction stored in the register and the instruction conveyed upon the first bus. The predefined sequence of consecutive instructions indicates that subsequent instructions belong to a different instruction set than the predefined sequence of consecutive instructions.

The present invention still further contemplates a method for switching from a first instruction set to a second instruction set while executing a program upon a microprocessor, comprising several steps. A plurality of consecutive instructions are decoded. The plurality of consecutive instructions is defined to indicate that a second plurality of instructions subsequent to the plurality of consecutive instructions are from the second instruction set. Instructions are routed to a first execute unit configured to execute instructions from the first instruction set if the plurality of consecutive instructions are not detected. Alternatively, instructions are routed to a second execute unit configured to execute instructions from the second instruction set if the plurality of consecutive instructions are detected.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
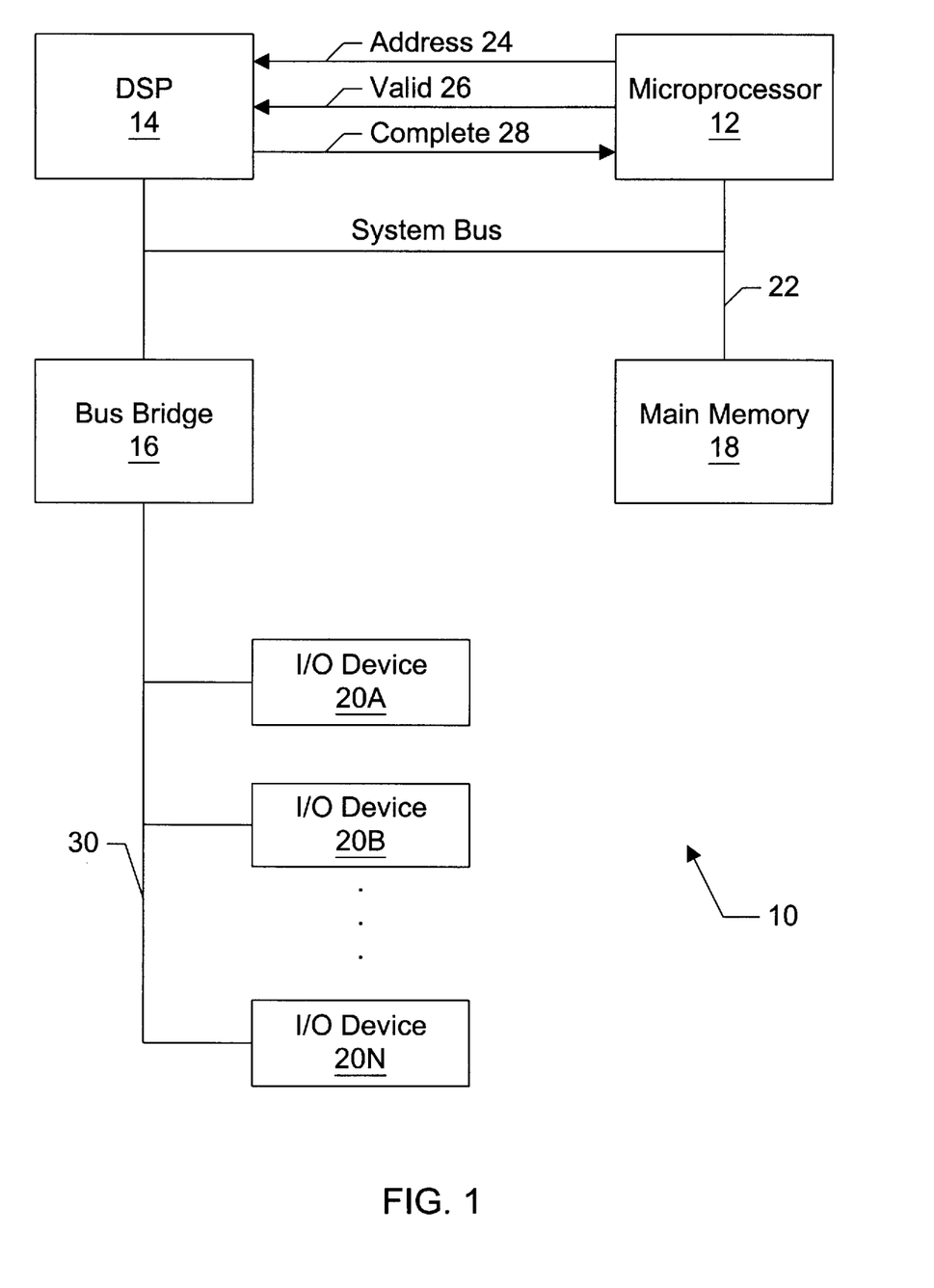
FIG. 1 is a block diagram of a computer system including a microprocessor.

Turning now to FIG. 1, one embodiment of a computer system 10 is shown. Computer system 10 includes a microprocessor 12, a DSP 14, a bus bridge 16, a main memory 18, and a plurality of input/output (I/O) devices 20A–20N (collectively referred to as I/O devices 20). A system bus 22 couples microprocessor 12, DSP 14, bus bridge 16, and main memory 18. Additionally, microprocessor 12 and DSP 14 are coupled together via an instruction bus 24, a valid conductor 26, and a complete conductor 28. I/O devices 20A–20N are coupled to bus bridge 16 via an I/O bus 30.

Generally speaking, microprocessor 12 is configured to execute instructions belonging to an instruction set. Additionally, a particular plurality of consecutive instructions from the instruction set are detected by microprocessor 12. The plurality of consecutive instructions comprise a predefined sequence of instructions which indicate that instructions subsequent to the predefined sequence belong to an alternate instruction set. In the embodiment shown, the subsequent instructions are encoded in the instruction set employed by DSP 14. When the predefined sequence is detected, microprocessor 12 transmits the subsequent instructions to DSP 14 upon instruction bus 24. Additionally, a signal upon valid conductor 26 is asserted to indicate that an instruction is being conveyed. DSP 14 receives and executes the instruction. Subsequent to the completion of the instruction, DSP 14 asserts a signal upon complete conductor 28. Microprocessor 12 may then dispatch another instruction to DSP 14, until the instructions encoded in the instruction set of DSP 14 are exhausted. Advantageously, the instructions are performed within DSP 14 instead of microprocessor 12. Performance of the computer system may be increased by executing each instruction sequence using the instruction set most efficient for that instruction sequence.

In one embodiment, the predefined sequence encodes the number of subsequent instructions which are coded in the alternate instruction set. Microprocessor 12 transmits the number of instructions provided by the predefined sequence to DSP 14. It is noted that DSP 14 may buffer instructions prior to execution, such that DSP 14 is capable of receiving additional instructions prior to completing execution of a particular instruction. When including buffering, DSP 14 is configured to assert the complete signal immediately upon receiving an instruction until the buffer is full.

In addition to detecting the predefined sequence of instructions, microprocessor 12 executes instructions and operates upon data. The data and instructions are typically stored in main memory 18. Microprocessor 12 is configured to communicate with I/O devices 20 through bus bridge 16. In one embodiment, microprocessor 12 employs the x86 microprocessor architecture. The predefined sequence of instructions may comprise a sequence of two MOV instructions having identical destination locations and immediate fields coded with a particular sequence of values. The immediate field of the second MOV instruction may store the number of subsequent instructions coded in the alternate instruction set. Alternatively, the predefined sequence may comprise a sequence of two identical XOR instructions which XOR an immediate field and a destination. The XOR instructions have no effect upon the destination (since the second XOR reverses the effects of the first XOR instruction), and the immediate field may be used to store the number of subsequent instructions which belong to the alternate instruction set. Any suitable instruction sequence may comprise the predefined instruction sequence.

It is noted that, if a routine communicates values to another routine comprising instructions from another instruction set, the communication may be effected through memory locations in main memory 18. One routine may store the communicated values into the memory locations, and the other routine may load these values. In this manner, the instruction sets may have dissimilar register sets and methods for accessing memory, and yet still communicate values between them.

In one embodiment, DSP 14 includes a digital signal processing core similar to the ADSP-2171 from Analog Devices, Inc. Additionally, DSP 14 includes circuitry for receiving instructions upon instruction bus 24 when the valid signal upon valid conductor 26 is asserted. DSP 14 may perform bus transactions upon system bus 22 to retrieve data to be operated upon from main memory 18, in one embodiment. In another embodiment, DSP 14 is coupled to a separate memory (not shown) from which it retrieves operands. In yet another embodiment, DSP 14 is included within an I/O device 20 upon I/O bus 30.

Bus bridge 16 is provided to assist in communications between I/O devices 20 and devices coupled to system bus 22. I/O devices 20 typically require longer bus clock cycles than microprocessor 12 and other devices coupled to system bus 22. Therefore, bus bridge 16 provides a buffer between system bus 22 and input/output bus 30. Additionally, bus bridge 16 translates transactions from one bus protocol to another. In one embodiment, input/output bus 30 is an Enhanced Industry Standard Architecture (EISA) bus and bus bridge 16 translates from the system bus protocol to the EISA bus protocol. In another embodiment, input/output bus 30 is a Peripheral Component Interconnect (PCI) bus and bus bridge 16 translates from the system bus protocol to the PCI bus protocol. It is noted that many variations of system bus protocols exist. Microprocessor 12 may employ any suitable system bus protocol.

I/O devices 20 provide an interface between computer system 10 and other devices external to the computer system. Exemplary I/O devices include a modem, a serial or parallel port, a sound card, etc. I/O devices 20 may also be referred to as peripheral devices. Main memory 18 stores data and instructions for use by microprocessor 12. In one embodiment, main memory 20 includes at least one Dynamic Random Access Memory (DRAM) cell and a DRAM memory controller.

It is noted that although computer system 10 as shown in FIG. 1 includes one microprocessor, other embodiments of computer system 10 may included multiple microprocessors similar to microprocessor 12. Similarly, multiple DSPs such as DSP 14 may be included within computer system 10. It is further noted that the above discussion refers to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

Figure 2:
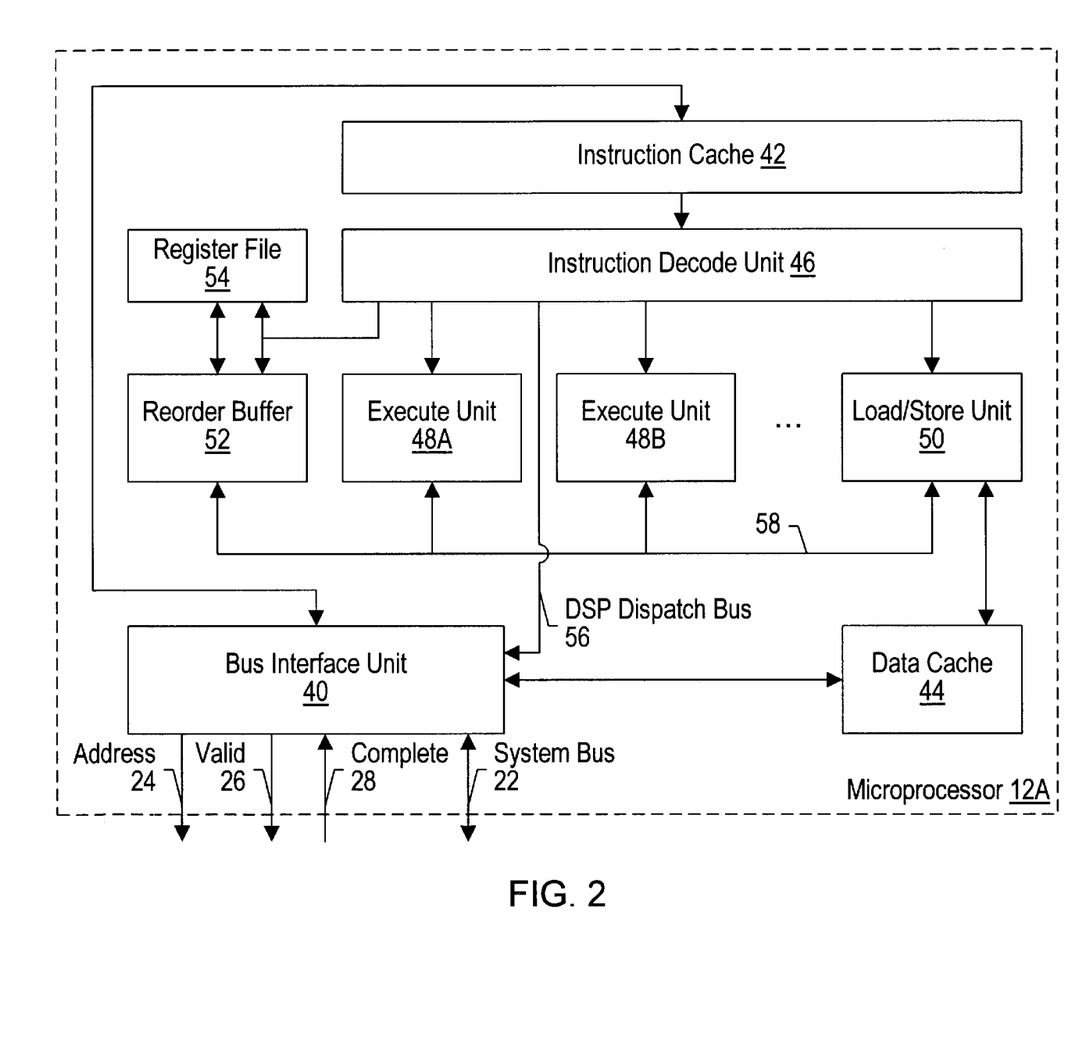
FIG. 2 is a block diagram of one embodiment of the microprocessor shown in FIG. 1, including an instruction decode unit.

Turning now to FIG. 2, one embodiment of microprocessor 12 (microprocessor 12A) is shown. Microprocessor 12A includes a bus interface unit 40, an instruction cache 42, a data cache 44, an instruction decode unit 46, a plurality of execute units including execute units 48A and 48B, a load/store unit 50, a reorder buffer 52, and a register file 54. The plurality of execute units will be collectively referred to herein as execute units 48, and may include more execute units than execute units 48A and 48B shown in FIG. 2. Additionally, an embodiment of microprocessor 12A may include one execute unit 48. Bus interface unit 40 is coupled to a DSP dispatch bus 56, which is further coupled to instruction decode unit 46. Additionally, bus interface unit 40 is coupled to instruction cache 42 and data cache 44. Instruction bus 24, valid conductor 26, complete conductor 28, and system bus 22 are coupled to bus interface unit 40. Instruction cache 42 is coupled to instruction decode unit 46, which is further coupled to execute units 48, reorder buffer 52, and load/store unit 50. Reorder buffer 52, execute units 48, and load/store unit 50 are each coupled to a result bus 58 for forwarding of execution results. Load/store unit 50 is coupled to data cache 44.

Generally speaking, instruction decode unit 46 is configured to detect the aforementioned predefined sequence of instructions. If the predefined sequence is not detected, instructions are dispatched to execute units 48 and load/store unit 50. If the predefined sequence is detected, instruction decode unit 46 transmits the subsequent instructions to bus interface unit 40 upon DSP dispatch bus 56. Upon receipt of an instruction upon DSP dispatch bus 56, bus interface unit 40 transmits the instruction upon instruction bus 24 and asserts a signal upon valid conductor 26. Microprocessor 12A continues subsequent instruction dispatch upon DSP dispatch bus 56 until the number of instructions specified by the predefined sequence have been dispatched. Once the requisite number of instructions have been dispatched, instruction dispatch to execute units 48 and load/store unit 50 may resume. Advantageously, each routine may be executed using the instruction set which most efficiently performs the routine.

Instruction cache 42 is a high speed cache memory for storing instructions. It is noted that instruction cache 42 may be configured into a set-associative or direct mapped configuration. Instruction cache 42 may additionally include a branch prediction mechanism for predicting branch instructions as either taken or not taken. Instructions are fetched from instruction cache 42 and conveyed to instruction decode unit 46 for decode and dispatch to an execution unit.

In the embodiment shown, instruction decode unit 46 decodes each instruction fetched from instruction cache 42. Instruction decode unit 46 dispatches each instruction to execute units 48 and/or load/store unit 50, or to DSP 14. Instruction decode unit 46 also detects the register operands used by the instructions dispatched to execute units 48 and/or load/store unit 50 and requests these operands from reorder buffer 52 and register file 54. In one embodiment, execute units 48 are symmetrical execution units. Symmetrical execution units are each configured to execute a particular subset of the instruction set employed by microprocessor 12A. The subsets of the instruction set executed by each of the symmetrical execution units are the same. In another embodiment, execute units 48 are asymmetrical execution units configured to execute dissimilar instruction subsets. For example, execute units 48 may include a branch execute unit for executing branch instructions, one or more arithmetic/logic units for executing arithmetic and logical instructions, and one or more floating point units for executing floating point instructions. Instruction decode unit 46 dispatches an instruction to an execute unit 48 or load/store unit 50 which is configured to execute that instruction. As used herein, the term "dispatch" refers to conveying an instruction to an appropriate execution unit or load/store unit for execution of the instruction.

Load/store unit 50 provides an interface between execute units 48 and data cache 44. Load and store memory operations are performed by load/store unit 50 to data cache 44. Additionally, memory dependencies between load and store memory operations are detected and handled by load/store unit 50.

Execute units 48 and load/store unit 50 may include one or more reservation stations for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservations stations. The centralized reservation station is coupled between instruction decode unit 46, execute units 48, and load/store unit 50. Such an embodiment may perform the dispatch function within the centralized reservation station.

Microprocessor 12A supports out of order execution, and employs reorder buffer 52 for storing execution results of speculatively executed instructions and storing these results into register file 54 in program order, for performing dependency checking and register renaming, and for providing for mispredicted branch and exception recovery. When an instruction is decoded by instruction decode unit 46, requests for register operands are conveyed to reorder buffer 52 and register file 54. In response to the register operand requests, one of three values is transferred to the execute unit 48 and/or load/store unit 50 which receives the instruction: (1) the value stored in reorder buffer 52, if the value has been speculatively generated; (2) a tag identifying a location within reorder buffer 52 which will store the result, if the value has not been speculatively generated; or (3) the value stored in the register within register file 54, if no instructions within reorder buffer 52 modify the register. Additionally, a storage location within reorder buffer 52 is allocated for storing the results of the instruction being decoded by instruction decode unit 46. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 48 or load/store unit 50 execute an instruction, the tag assigned to the instruction by reorder buffer 52 is conveyed upon result bus 58 along with the result of the instruction. Reorder buffer 52 stores the result in the indicated storage location. Additionally, execute units 48 and load/store unit 50 compare the tags conveyed upon result bus 58 with tags of operands for instructions stored therein. If a match occurs, the unit captures the result from result bus 58 and stores it with the corresponding instruction. In this manner, an instruction may receive the operands it is intended to operate upon. Capturing results from result bus 58 for use by instructions is referred to as "result forwarding".

Instruction results are stored into register file 54 by reorder buffer 52 in program order. Storing the results of an instruction and deleting the instruction from reorder buffer 52 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 52 discards the instructions subsequent to the mispredicted branch instructions. Instructions thus discarded are also flushed from execute units 48, load/store unit 50, and instruction decode unit 46.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

Register file 54 includes storage locations for each register defined by the microprocessor architecture employed by microprocessor 12A. For example, microprocessor 12A may employ the x86 microprocessor architecture. For such an embodiment, register file 54 includes locations for storing the EAX, EBX, ECX, EDX, ESI, EDI, ESP, and EBP register values.

Data cache 44 is a high speed cache memory configured to store data to be operated upon by microprocessor 12A. It is noted that data cache 44 may be configured into a set-associative or direct-mapped configuration.

Bus interface unit 40 is configured to effect communication between microprocessor 12A and devices coupled to system bus 22. For example, instruction fetches which miss instruction cache 42 may be transferred from main memory 18 by bus interface unit 40. Similarly, data requests performed by load/store unit 50 which miss data cache 44 may be transferred from main memory 18 by bus interface unit 40. Additionally, data cache 44 may discard a cache line of data which has been modified by microprocessor 12A. Bus interface unit 40 transfers the modified line to main memory 18.

It is noted that instruction decode unit 46 may be configured to dispatch an instruction to more than one execution unit. For example, in embodiments of microprocessor 12A which employ the x86 microprocessor architecture, certain instructions may operate upon memory operands. Executing such an instruction involves transferring the memory operand from data cache 44, executing the instruction, and transferring the result to memory (if the destination operand is a memory location). Load/store unit 50 performs the memory transfers, and an execute unit 48 performs the execution of the instruction.

Figure 3:
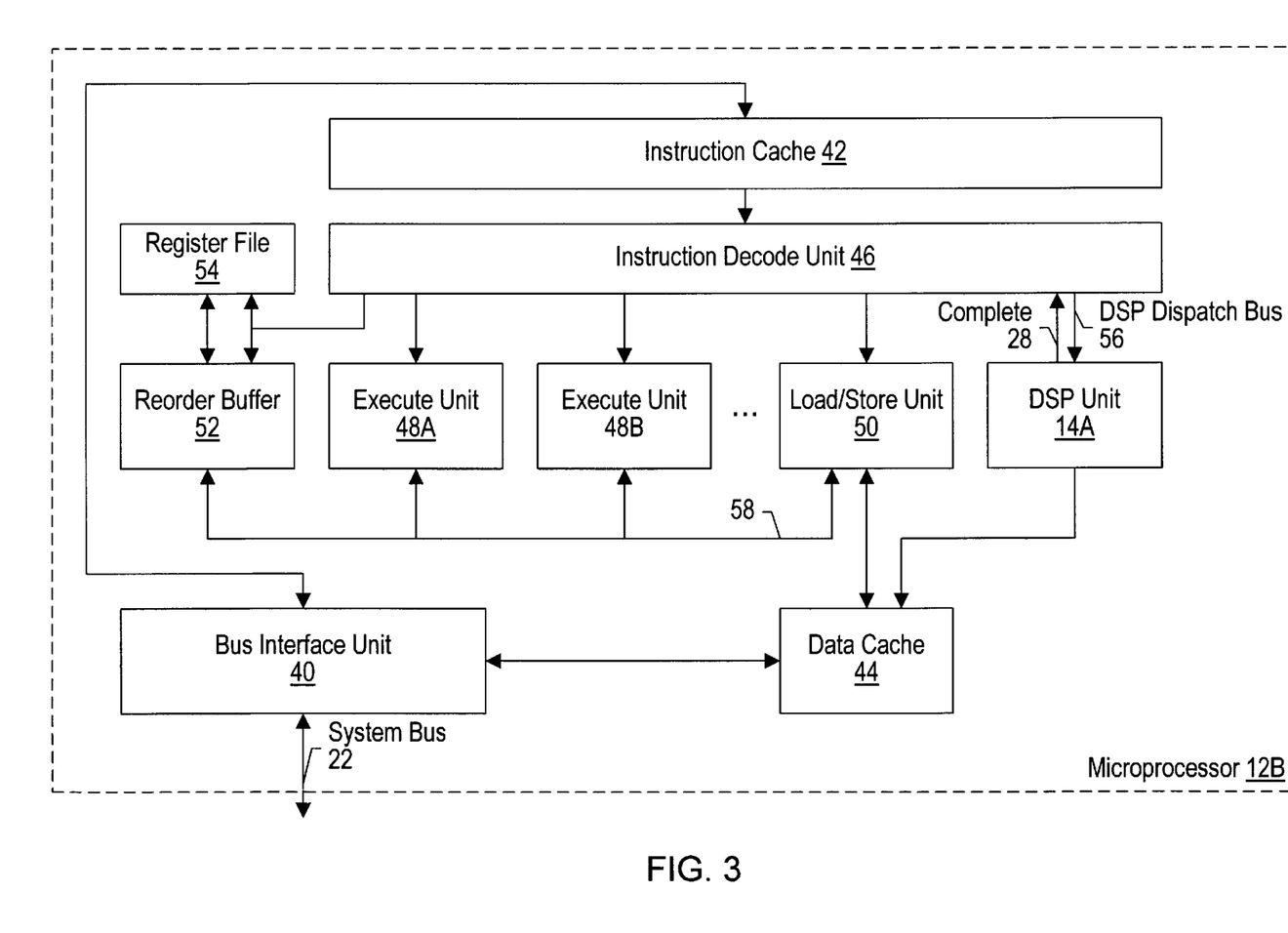
FIG. 3 is a block diagram of another embodiment of the microprocessor shown in FIG. 1, including an instruction decode unit.

Turning now to FIG. 3, a second embodiment of microprocessor 12 (microprocessor 12B) is shown. Like numbered elements in FIGS. 2 and 3 are similar. In addition to the elements shown in FIG. 2, microprocessor 12B integrates DSP 14 (shown in FIG. 1) as a DSP unit 14A. Bus interface unit 40 includes circuitry for effecting communication upon system bus 22, but does not include busses and conductors for communicating with DSP 14 in this embodiment. Instead, DSP unit 14A and instruction decode unit 46 communicate directly. Advantageously, a computer system equipped with microprocessor 12B may eliminate the separate DSP shown in FIG. 1.

DSP unit 14A may be configured similar to DSP 14. However, DSP unit 14A accepts instructions upon DSP dispatch bus 56 from instruction decode unit 46 instead of upon instruction bus 24. Once a dispatched instruction is complete, DSP unit 14A asserts a signal upon complete conductor 28 to instruction decode unit 46. Additionally, DSP unit 14A may be configured to access data cache 44 for data operands. Data operands may be stored in a memory within DSP unit 14A for quicker access, or may be accessed directly from data cache 44 when needed. It is noted that DSP 14A may be configured with buffering similar to DSP 14 or similar to the reservation stations described above.

Additional information regarding microprocessors may be found within the commonly assigned, co-pending patent application entitled "High Performance Superscalar Microprocessor", Ser. No. 08/146,382, filed Oct. 29, 1993 by Witt, et al. Further information regarding microprocessors may be found within the commonly assigned, co-pending patent application entitled "Superscalar Microprocessor Including a High Performance Instruction Alignment Unit", Ser. No. 08/377,843, filed Jan. 25, 1995 by Witt, et al. The disclosures of these patent applications are incorporated herein by reference in their entirety.

Figure 4:
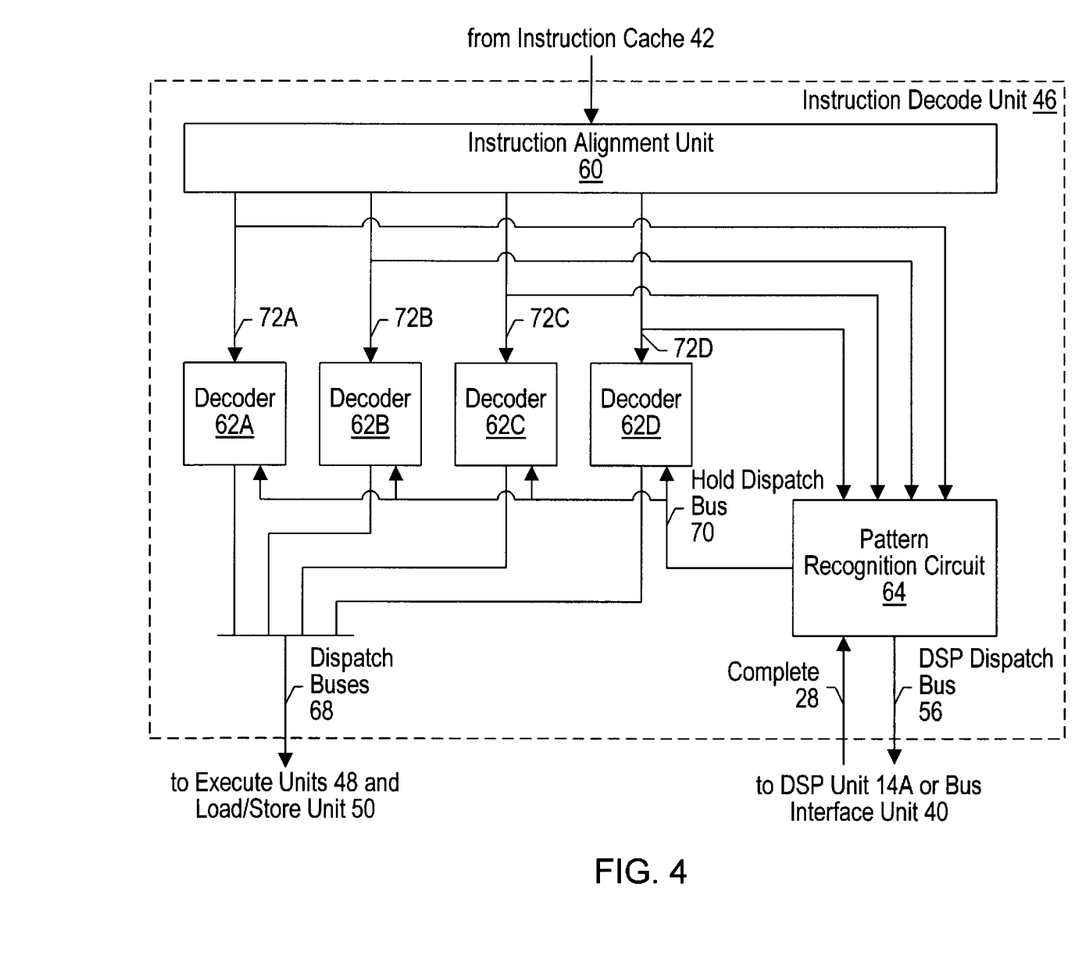
FIG. 4 is a block diagram of one embodiment of the instruction decode unit shown in FIGS. 2 and 3, including a pattern recognition circuit.

Turning now to FIG. 4, one embodiment of instruction decode unit 46 is shown. Instruction decode unit 46 includes an instruction alignment unit 60, a plurality of decoder circuits including decoder circuits 62A–62D (collectively referred to as decoder circuits 62), and a pattern recognition circuit 64. More or fewer decoder circuits 62 may be included in various embodiments. Instruction alignment unit 60 is coupled to receive instructions fetched from instruction cache 42, and to align instructions to decoder circuits 62. Instructions are also conveyed to pattern recognition circuit 64 upon instruction buses 72A–72D. Each decoder circuit 62 decodes the instruction received from instruction alignment unit 60 to determine the register operands manipulated by the instruction as well as the unit to receive the instruction. An indication of the unit to receive the instruction as well as the instruction itself are conveyed upon a plurality of dispatch buses 68 to execute units 48 and load/store unit 50. Other buses, not shown, are used to request register operands from reorder buffer 52 and register file 54.

Upon detection of the predefined sequence of instructions, pattern recognition circuit 64 begins dispatching subsequent instructions upon DSP dispatch bus 56 to bus interface unit 40 (in microprocessor 12A) or DSP unit 14A (in microprocessor 12B). An asserted complete signal upon complete conductor 28 indicates that the instruction has been completed (or accepted into a buffer, as noted above). Additionally, hold signals are asserted upon a hold dispatch bus 70 coupled between pattern recognition circuit 64 and decoder circuits 62. The asserted hold signals cause decoder circuits 62 to ignore instructions conveyed from instruction alignment unit 60. Therefore, decoder circuits 62 do not attempt to decode and dispatch instructions from the alternate instruction set to execute units 48 or load/store unit 50.

It is noted that, in one embodiment, an instruction received by decoder circuit 62A is prior to an instruction concurrently received by decoder circuit 62B in program order. Similar relationships exist between other decoder circuits 62. When pattern recognition circuit 64 detects the predefined sequence, hold signals upon hold dispatch bus 70 are asserted to the decoder circuits 62 which receive instructions subsequent to the predefined sequence in program order. Decoder circuits 62 which receive instructions prior to and including the predefined sequence receive deasserted hold signals. The instructions prior to and including the predefined sequence are thereby dispatched to execute units 48 or load/store unit 50. Similarly, when the number of instructions indicated by the predefined sequence is exhausted, decoder circuits 62 receiving instructions which are conveyed to decoder circuits 62 concurrently with the final instructions from the alternate instruction set receive deasserted hold signals. These instructions are thereby dispatched concurrently with dispatch by pattern recognition circuit 64 of the final instructions belonging to the alternate instruction set.

Each of decoder circuits 62 is configured to convey an instruction upon one of dispatch buses 68, along with an indication of the unit or units to receive the instruction. In one embodiment, a bit is included within the indication for each of execute units 48 and load/store unit 50. If a particular bit is set, the corresponding unit is to execute the instruction. If a particular instruction is to be executed by more than one unit, more than one bit in the indication may be set.

Instruction alignment unit 60 is included to route instructions to decoder circuits 62. In one embodiment, instruction alignment unit 60 includes a byte queue in which instruction bytes fetched from instruction cache 42 are queued. Instruction alignment unit 60 locates valid instructions from within the byte queue and dispatches the instructions to respective decoder circuits 62. In another embodiment, instruction cache 42 includes predecode circuitry which predecodes instruction bytes as they are stored into instruction cache 42. Start and end byte information indicative of the beginning and end of instructions is generated and stored within instruction cache 42. The predecode data is transferred to instruction alignment unit 60 along with the instructions, and instruction alignment unit 60 transfers instructions to the decoder circuits 62 according to the predecode information. Instruction alignment unit 60 may be configured similar to the disclosure of the commonly assigned, co-pending patent application entitled: "A High Speed Instruction Alignment Unit for a Superscalar Microprocessor", Ser. No. 08/421, 669, filed Apr. 12, 1995 by Johnson, et al. The disclosure of this patent application is incorporated herein by reference in its entirety. Additionally, instruction alignment unit 60 may be configured to pass instructions through without attempting to perform alignment during times in which pattern recognition circuit 64 is dispatching instructions upon DSP dispatch bus 56. Pattern recognition circuit 64 detects the boundaries of the instructions and routes the instructions appropriately.

Figure 5:
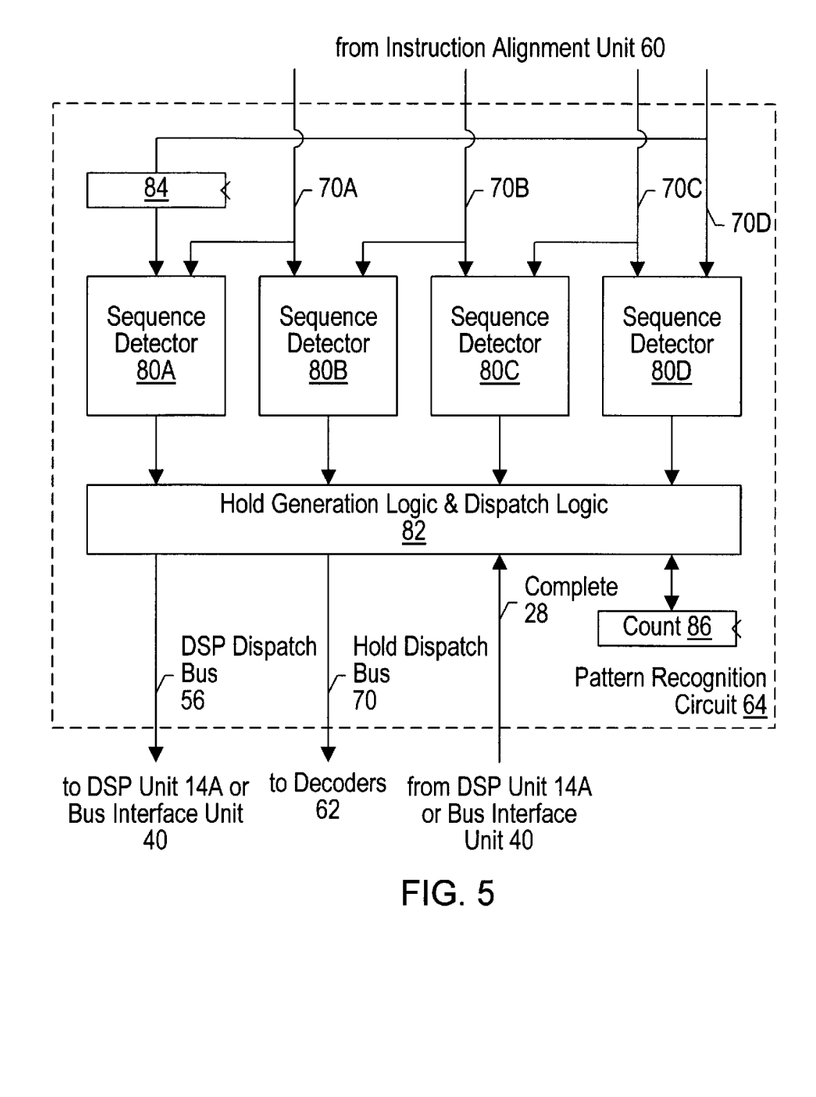
FIG. 5 is a block diagram of one embodiment of the pattern recognition circuit shown in FIG. 4.

Turning next to FIG. 5, a block diagram of one embodiment of pattern recognition circuit 64 is shown. In this embodiment, pattern recognition circuit 64 includes a plurality of sequence detector circuits 80A–80D (collectively referred to as sequence detector circuits 80), a hold generation and dispatch logic block 82, a register 84, and a count register 86. Sequence detector circuits 80 are coupled to logic block 82. Logic block 82 is coupled to hold dispatch bus 70, complete conductor 28, DSP dispatch bus 56, and count register 86.

Sequence detector circuit 80B is coupled to receive instructions from instruction buses 70A and 70B. The instructions upon instruction buses 70A and 70B are consecutive in program order, with the instruction upon instruction bus 70A being prior to the instruction upon instruction bus 70B. Sequence detector circuit 80B examines the received instructions to determine if the instructions comprise the predefined sequence indicating that subsequent instructions belong to the alternate instruction set. Sequence detector circuits 80C and 80D perform similar examinations upon instructions conveyed upon instruction buses 70 coupled as shown in FIG. 5.

Sequence detector circuit 80A receives the instruction conveyed upon instruction bus 70A as well as the contents of register 84. Register 84 is coupled to receive the instruction conveyed upon instruction bus 70D. Therefore, register 84 stores the last instruction (in program order) conveyed during a clock cycle to pattern recognition circuit 64. Assuming that instructions received in a subsequent clock cycle are consecutive with the prior instructions, the instruction upon instruction bus 70A is consecutive to the instruction previously conveyed upon instruction bus 70D (in program order). Sequence detector 80A thereby detects the predefined instruction sequence even if the instructions comprising the predefined instruction sequence are conveyed during different clock cycles. As shown in FIG. 5, sequence detector circuits 80 are configured to detect a sequence of two instructions. For embodiments in which the predefined sequence is longer than two instructions, additional registers similar to register 84 would be included to allow detection of the longer sequences even if the sequence is conveyed in different clock cycles. Still further, each detector circuit 80 would receive a number of instructions equal to the number of instructions contained in the predefined sequence. In an embodiment in which instruction decode unit 46 receives one instruction per clock cycle, sequence detector 80A is used with register 84 to detect the predefined instruction sequence.

When a sequence detector 80A–80D detects the predefined instruction sequence, the sequence detector 80A–80D asserts a signal to logic block 82 indicating that the instruction sequence has been detected. Additionally, the instructions received by sequence detector circuits 80 are conveyed to logic block 82.

Upon receiving an asserted signal indicating detection of the predefined instruction sequence from sequence detector circuits 80, logic block 82 generates hold signals for each decoder circuit 62 within instruction decode unit 46. Hold signals are asserted for the decoder circuits 62 which are decoding instructions subsequent to the predefined instruction sequence in program order. Hold signals are also asserted according to the count of DSP instructions remaining (once dispatch upon DSP dispatch bus 56 has begun). When the count is greater than the number of decoder circuits 62, each hold signal upon hold dispatch bus 70 is asserted. When the count is less than the number of decoder circuits 62, hold signals are asserted to a number of decoder circuits 62 equal to the count, and the remainder of the hold signals are deasserted. In this manner, instructions subsequent to the sequence of DSP instructions are dispatched by decoder circuits 62.

Logic block 82 further receives the instructions conveyed to each decoder circuit 80A–80D. Logic block 82 retrieves the count of DSP instructions from the predefined instruction sequence. Instructions subsequent to predefined sequence which are conveyed concurrently with the predefined sequence are dispatched upon DSP dispatch bus 56, and the count is decremented by the number of instructions dispatched. Logic circuit 82 stores the resulting count in count register 86.

During subsequent clock cycles, DSP instructions continue to be dispatched upon DSP dispatch bus 56 and the count stored in count register 86 is decremented until the count is exhausted. If an asserted complete signal is not received upon complete conductor 28 for instructions dispatched during a clock cycle, logic block 82 stalls subsequent instruction dispatch until the asserted complete signal is received. Various stall mechanisms are well known, and logic block 82 may employ any suitable stall mechanism.

It is noted that the function provided by sequence detector circuits 80 may be included within decoder circuits 62 in another embodiment. Signals indicative of detected sequences would then be conveyed to pattern recognition circuit 64 by decoder circuits 62. It is further noted that logic block 82 may be configured to detect branch instructions. If a branch instruction branches to an instruction prior to the branch instruction within the instruction sequence, logic block 82 increments the count stored in count register 86 by the number of instructions between the branch instruction and the target of the branch. If a branch instruction branches to an instruction subsequent to the branch instruction within the instruction sequence, logic block 82 decrements the count by the number of instructions between the branch instruction and the target of the branch. If a branch out of the instruction sequence is detected, the count is set to zero. Instruction fetching and execution then continue in execute units 48.

It is still further noted that, although shown as separate blocks on FIG. 5, sequence detector circuits 80 may share certain logic to minimize the number of logic gates employed. For example, the instructions received upon instruction buses 70 may be decoded in a common logic block to detect instructions within the predefined instruction sequence, and the decoded indications combined in sequence detector circuits 80 to detect the predefined instruction sequence.

It is noted that the above discussion often refers to instructions being subsequent to or prior to other instructions. As used herein, a first instruction is prior to a second instruction if the first instruction is encountered first in the order of instructions within the program (i.e. in program order). Similarly, a first instruction is subsequent to a second instruction if the second instruction is subsequent to the second instruction in program order.

In accordance with the above disclosure, a microprocessor has been described which includes a pattern recognition circuit capable of detecting a predefined instruction sequence. Upon detection of the predefined instruction sequence, a number of subsequent instructions are dispatched to a unit or a separate processor configured to execute a different instruction set than the microprocessor. Advantageously, a program may include instructions from a pair of dissimilar instruction sets. The instruction set most efficient for performing a particular routine may be chosen to code that particular routine. The program may enjoy enhanced performance due to the availability of two (or more) instruction sets.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   an instruction cache configured to store a plurality of instructions including a plurality of consecutive instructions from a first instruction set and a second plurality of instructions, wherein said plurality of consecutive instructions form a predetermined sequence of at least a first designated instruction followed directly by a subsequent designated instruction, wherein said sequence is defined to indicate that each of said second plurality of instructions which follow said plurality of consecutive instructions in program order are from a second instruction set different from said first instruction set;
   an instruction decode unit coupled to receive said plurality of instructions from said instruction cache, wherein said instruction decode unit is configured to detect said sequence by determining that said first designated instruction is directly followed by said subsequent designated instruction, and wherein said instruction decode unit is configured to decode said second plurality of instructions in accordance with said second instruction set as a result of detecting said sequence of said plurality of consecutive instructions;
   a first execute unit coupled to receive a first instruction belonging to said first instruction set from said instruction decode unit, wherein said first execute unit is configured to execute said first instruction; and
   a second execute unit coupled to receive a second instruction belonging to said second instruction set from said instruction decode unit, wherein said second execute unit is configured to execute said second instruction.

2. The microprocessor as recited in claim 1 wherein said second execute unit is a DSP unit.

3. The microprocessor as recited in claim 1 wherein said instruction decode unit is further configured to route said second plurality of instructions to said second execute unit.

4. The microprocessor as recited in claim 1 wherein said plurality of consecutive instructions indicate a number of said second plurality of instructions.

5. The microprocessor as recited in claim 1 wherein said instruction decode unit comprises:

a plurality of decoders coupled to receive said plurality of instructions from said instruction cache, wherein said plurality of decoders are configured to decode and dispatch instructions to said first execute unit; and a pattern recognition circuit coupled to receive said plurality of instructions from said instruction cache, wherein said pattern recognition circuit is configured to detect said sequence of said plurality of consecutive instructions and to dispatch said second plurality of instructions to said second execute unit.

6. The microprocessor as recited in claim 5 wherein said instruction decode unit further comprises an instruction alignment unit configured to align instructions from said first instruction set to said plurality of decoders.

7. The microprocessor as recited in claim 6 wherein said pattern recognition circuit comprises:

a plurality of sequence detectors coupled to receive said plurality of instructions, wherein said plurality of sequence detectors is configured to detect said sequence of said plurality of consecutive instructions; and a logic circuit coupled to receive an indication of said sequence of said plurality of consecutive instructions from said plurality of sequence detectors, wherein said logic circuit is configured to dispatch said second plurality of instructions to said second execute unit upon detection of said sequence of said plurality of consecutive instructions.

8. The microprocessor as recited in claim 7 wherein said logic circuit asserts signals to said plurality of decoders within said instruction decode unit, and wherein each of said plurality of decoders are configured to ignore a received instruction upon receipt of a corresponding asserted signal.

9. The microprocessor as recited in claim 7 wherein said pattern recognition circuit further comprises a register, and wherein said logic circuit is configured to store a count of said second plurality of instructions within said register.

10. A method for switching from a first instruction set to a second instruction set while executing a program within a microprocessor, comprising:

detecting a plurality of specific consecutive instructions which form a sequence defined to indicate that a second plurality of instructions subsequent to said plurality of consecutive instructions are from said second instruction set;

routing instructions to a first execute unit configured to execute instructions from said first instruction set if said plurality of specific consecutive instructions forming said sequence is not detected; and routing instructions to a second execute unit configured to execute instructions from said second instruction set in response to determining the presence of said plurality of specific consecutive instructions to thereby detect said sequence.

11. The method as recited in claim 10 wherein said detecting further comprises capturing a number of said second plurality of instructions from said plurality of consecutive instructions.

12. The method as recited in claim 11 further comprising routing instructions to said first execute unit after said number of said second plurality of instructions are routed to said second execute unit.

13. The method as recited in claim 10 wherein said second execute unit is configured into another microprocessor coupled to said microprocessor.

14. The method as recited in claim 13 wherein said another microprocessor comprises a digital signal processor.

15. A microprocessor comprising:

an instruction cache configured to store a plurality of instructions, wherein said plurality of instructions comprises instructions from two different instruction sets, and wherein a predefined sequence of consecutive instructions from a first instruction set is defined to indicate that instructions from a second instruction set follow said predefined sequence of consecutive instructions in a program order;

an instruction decode unit coupled to receive said plurality of instructions from said instruction cache, wherein said instruction decode unit is configured to detect said predefined sequence of consecutive instructions and to responsively decode a subsequent instruction in accordance with said second instruction set as a result of determining that said predefined sequence of consecutive instructions has been received by said instruction decode unit;

a first execute unit coupled to receive and execute instructions from said first instruction set from said instruction decode unit; and a second execute unit coupled to receive and execute instructions from said second instruction set from said instruction decode unit.

16. The microprocessor as recited in claim 15 wherein said predefined sequence of consecutive instructions is configured to indicate how many instructions from said second instruction set follow.

* * * * *